Aug. 2, 1966  J. W. ROBINS  3,263,696
MECHANICALLY ADJUSTABLE BALANCE PLATE ASSEMBLY
Filed Nov. 29, 1963  2 Sheets-Sheet 1
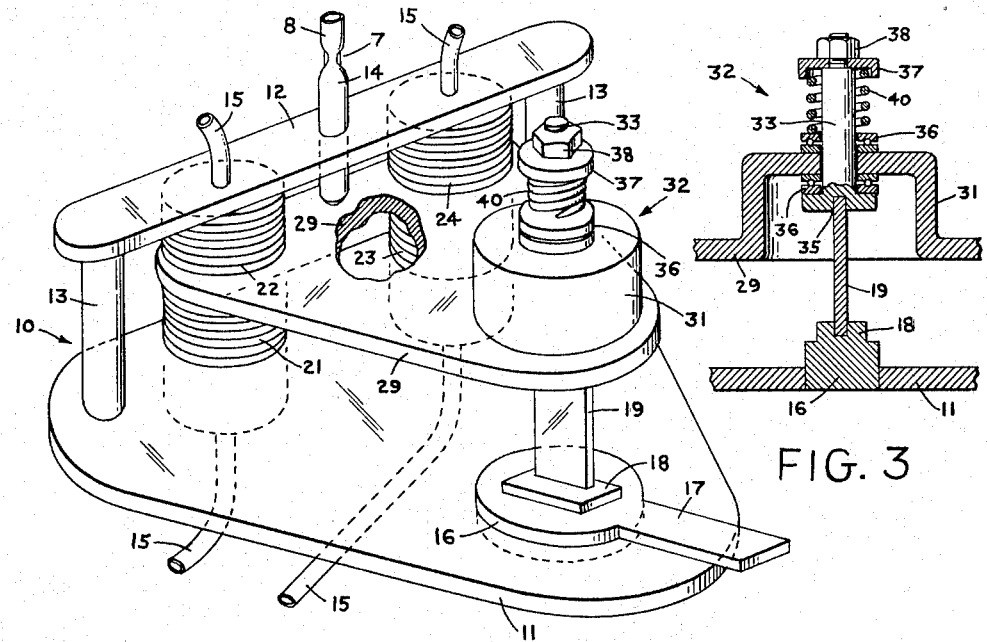
FIG. 1
FIG. 3
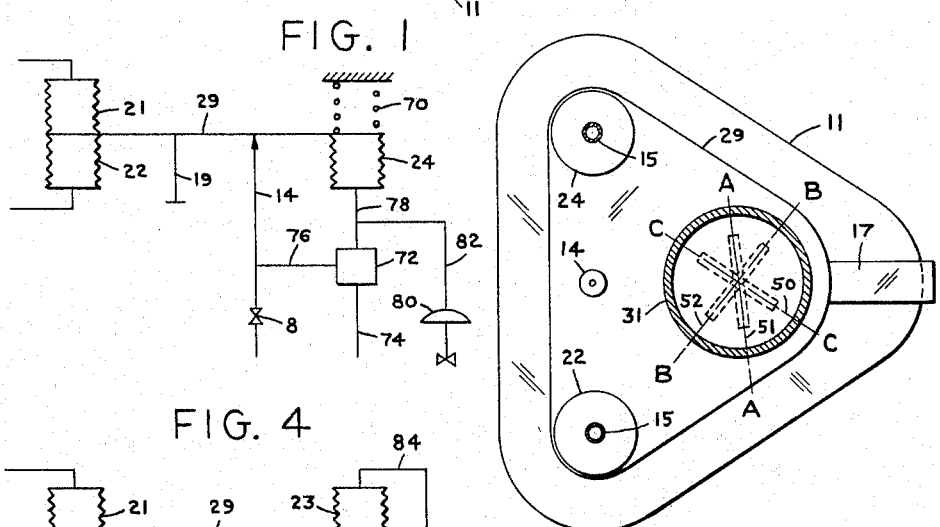
FIG. 4
FIG. 2
FIG. 5
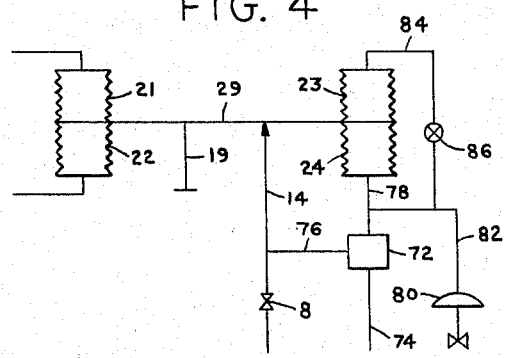
JOHN W. ROBINS
INVENTOR.
BY Daniel R. Bobis
atty Aug. 2, 1966        J. W. ROBINS        3,263,696
MECHANICALLY ADJUSTABLE BALANCE PLATE ASSEMBLY
Filed Nov. 29, 1963                     2 Sheets-Sheet 2

JOHN W. ROBINS
INVENTOR.

BY Daniel R. Robins
atty

United States Patent Office 3,263,696
Patented August 2, 1966

---

3,263,696
MECHANICALLY ADJUSTABLE BALANCE PLATE ASSEMBLY
John W. Robins, Westwood, Mass., assignor to Worthington Corporation, Harrison, N.J., a corporation of Delaware
Filed Nov. 29, 1963, Ser. No. 326,942
21 Claims. (Cl. 137—86)

This invention relates to an improved, mechanically adjustable balance plate assembly of a type particularly adaptable, for example but not exclusively, to use in force balance controllers of the nature disclosed in U.S. Patent 2,742,917, issued April 24, 1956, to H. L. Bowditch.

It is a primary object of this invention to provide a balance plate assembly as above of reduced complexity and manufacturing cost.

Another object of the invention is the provision of a more compact balance plate assembly embodying more precise operational characteristics due to the improved design and construction thereof.

A further object is the provision of a more durable balance plate assembly better able to withstand external shock without material effect on the adjustment thereof.

The objects, advantages, and manner of operation of a force balance controller wherein is utilized a mechanically adjustable balance plate assembly of this nature are believed made clear in the Bowditch Patent 2,742,917, whereby reference may be had thereto for a complete description thereof. Further, since the same cooperatively associated pneumatic systems, except where specified in detail hereinbelow, connected in the same manner, would be employed in both a force balance controller utilizing the mechanically adjustable balance plate assembly disclosed in the said Bowditch patent, and a force balance controller utilizing the improved, mechanically adjustable balance plate assembly of this invention, further reference is made to the said patent for a detailed description of the construction and manner of operation of the said cooperatively associated pneumatic systems.

Mechanically adjustable balance plate assemblies of the nature disclosed in Bowditch Patent 2,742,917, will however be seen to necessitate the employment of a separate, adjustably positionable fulcrum element, in addition to a balance plate supporting flexure element, to enable the adjustment of the tilt axis of the plate whereby is established the proportioning band setting of the force balance controller. The improved design and construction of the balance plate assembly of this invention make possible the elimination of this separate adjustable fulcrum element by the utilization of a single, angularly adjustable flexure element to adjustably define the tilt axis of the balance plate. Additionally, the independent and relatively cumbersome plate orientation control bellows system of the prior art device is replaced in the improved balance plate assembly of the invention by a more compact system of opposed belloframs, the pistons of which are connected directly to the balance plate surfaces. This direct connection provides more precise operational characteristics and a more compact and rugged assembly better able to withstand external shock without significant effect upon the precise adjustment thereof. Another advantage derived from the use of opposed belloframs, as compared to independent bellows, resides in the relative ease with which the critical effective areas of the opposed belloframs may be precisely matched by accurate control of the bellofram piston and bore machining process. This may be contrasted with the problems inherent in precisely matching bellows whereby relatively expensive selection procedures are necessitated.

The above and other objects and advantages of the invention are believed made clear by detailed reference hereinbelow to the accompanying drawings wherein:

FIG. 1 is a simplified perspective view of a balance plate assembly illustrating the improved features of the invention;

FIG. 2 is a top view of the assembly of FIG. 1 with parts omitted;

FIG. 3 is a vertical sectional view of the balance plate-flexure element attachment assembly;

FIG. 4 is a schematic diagram of the balance plate assembly of the invention utilized in a proportional, force balance controller;

FIG. 5 is a schematic diagram of the balance plate assembly of the invention utilized in a proportional-reset, force balance controller;

Figure 6:
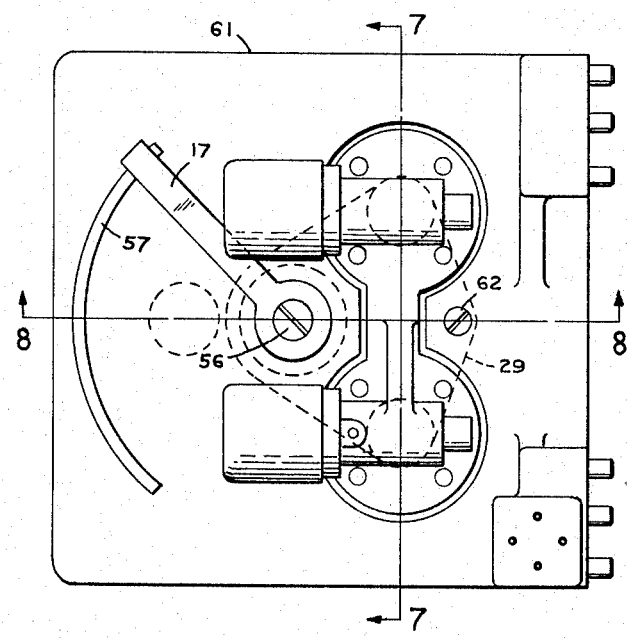
FIG. 6 is a top plan view of a balance plate assembly constructed in accordance with the teachings of the invention and depicted in conjunction with suitable casing means.

Referring to FIGS. 1 and 2, the balance plate assembly is seen to comprise a fixedly positioned thrust plate assembly, generally indicated at 10, and including a thrust plate 11, and a nozzle-support element 12 mounted thereon by mounting posts 13 extending therebetween. A control nozzle 14, of a type well known in this art, is positioned as shown within an aperture in the nozzle support element with the discharge end thereof oriented toward the thrust plate. A fixed, metering orifice 7 is positioned as shown within the supply conduit 8 of the said nozzel. The nozzle may be fixedly positioned in the said aperture or it may be adjustably positioned therein in any convenient manner, with the only critical aspect being the ability to fixedly secure the nozzle to the nozzle-support element after the former has been properly positioned relative thereto. Flexure support member 16 is rotatably mounted within an aperture in the thrust plate in any convenient manner which makes possible only relative rotational movement therebetween, whereby the support member is at all time maintained at the same level relative to the plate. The support member 16 includes an adjusting handle 17 to make possible the convenient adjustment of the angular orientation of the said member relative to the plate. A slotted, raised portion 18 is provided on the upper surface of the flexure support member whereby one end of a flexure strip or element 19 may be fixedly positioned therewithin in any convenient manner, as for example by brazing, to extend upwardly therefrom. Two pairs of opposed, precisely matched belloframs, 21 and 22, and 23 and 24, respectively, are fixedly mounted on the thrust plate assembly, with the lower belloframs 21 and 23 of the pairs mounted on the thrust plate 11 and the upper belloframs 22 and 24 on the nozzle-support element 12. The belloframs are of identical construction and effective areas within each comprising an expansible, generally cylindrical chamber 26 with a matching piston 27 positioned therein and attached thereto by attachment member 28 in a manner not illustrated in the subject figures but made clear by FIG. 7. Each of the belloframs includes a conduit 15 whereby a control pressure may be introduced thereto.

Balance plate 29, preferably but not necessarily of the depicted generally triangular configuration, is positioned as shown on the thrust plate assembly with two of the corners thereof attached directly to, and adjustably supported by, the opposed pistons of the bellofram pairs. The upper surface of the balance plate is located in extremely close proximity to the discharge end of control nozzle 14 whereby a relatively substantial back-pressure—the magnitude of which is inversely proportional to the distance between the nozzle and the plate—will be created in the nozzle as a result of the interference with the discharge of air therefrom presented by the balance plate surface. At the third corner, the balance plate includes an apertured, generally cylindrical cup shaped portion 31 extending upwardly therefrom to enable the attachment of the plate to the flexure element in a manner made clear by FIG. 3. As seen therein, a flexure attachment assembly, generally indicated at 32, is utilized for this purpose and includes an elongated attachment element 33 which extends as shown through the aperture in the cup shaped portion of the balance plate. A slotted, enlarged end portion 34 is included on the attachment element whereby the other end of the flexure element may be fixedly attached thereto, again in any convenient manner, as for example by brazing at 35. The attachment element is rotatably journaled in the balance plate aperture by thrust ball bearings 36 mintained therebetween by loading spring 40. The loading spring is in turn maintained in position on the attachment element by flanged spring holder 37 and nut 38 in the depicted manner. Thus, the balance plate may be "tilted" about the corner thereof attached to the flexure element by movement at either of the corners thereof which are attached to the pistons of the respective bellofram pairs. Such balance plate "tilting" will, of course, function to vary the distance between the surface of the plate and the discharge end of the fixedly positioned control nozzle 14 (see FIG. 1), whereby back-pressure conditions within the nozzle may be varied. In actual practice, it may be noted that an extremely small amount of balance plate movement toward the discharge end of the nozzle, as for example less than .001″, will function to throttle the latter. The thrust ball bearings 36 function to both absorb thrust when the plate is tilted and reduces friction when the flexure and attachment elements are rotated relative thereto to make possible, in the latter instance, rotation of the flexure and attachment elements through handle 17 without significant twisting of the flexure element.

FIG. 2 is believed to make clear the manner in which the flexure element defines the tilt axis of the balance plate, whereby may be understood the manner in which relative rotation between the flexure element and plate functions to vary the orientation of the tilt axis to vary the effect of a change in pressure, and resultant piston movement, in one or more of the belloframs upon the location of the plate relative to the discharge end of the control nozzle. For convenience of description, the three depicted exemplary positions of the flexure element relative to the balance plate have been identified as 50, 51 and 52, respectively, with the plate tilt axes defined by the former in each of the said positions illustrated by dashed lines and identified as A—A, B—B and C—C, respectively. In general, the tilt axis established by the flexure element may be considered as that axis about which the element will flex or bend most readily. Assuming the flexure element to have a top or upper edge surface of the depicted rectangular configuration, the tilt axis will be seen to coincide with the major axis of the said rectangular top surface. The flexure element will bend most readily in response to a bending force applied thereto in a direction perpendicular to the said axis, and least readily in response to a bending force applied thereto in a direction parallel to, or coincident with, the said axis. In the structural arrangement depicted in FIG. 3, all bending forces are applied to the flexure element through the surface of the balance plate from the connected bellofram pistons, whereby a force applied to the plate surface at a point on a line perpendicular to the tilt axis will have maximum bending effect on the flexure element, while a force applied to the plate surface at a point on a line parallel to, or coincident with, the tilt axis will have minimum bending effect on the said element. Thus, for a given bending force applied to the flexure element by the plate through a change in pressure conditions in one or more of the belloframs, the said plate will be tilted in response thereto (and the relative positioning of the plate surface and discharge end of the control nozzle changed accordingly) to an extent determined by the magnitude of the bending force and the tilt axis determining orientation of the flexure element relative to the point of application of the bending force, i.e., the point of balance plate attachment to the particular bellofram piston or pistons exerting the bending force.

Referring now in greater detail to FIG. 2, it will be seen wherein adjustment of the tilt axis functions, in the end result, to vary the effect of a change in pressure conditions in any or all of the belloframs upon the orientation of the balance plate relative to the control nozzle. This is so because the tilt axis functions to define the respective moment arms for the forces applied to the balance plate by net pressure differenials in the bellofram pairs 21 and 22, and 23 and 24, respectively. For example, with the flexure element adjusted through handle 17 to the position indicated at 51, the resultant balance plate tilt axis will coincide with dashed line A—A whereby the flexure element will present the same resistance to bending forces generated by changes in pressure conditions in any of the four belloframs. That is to say that the extent of the change in plate orientation relative to the nozzle will be the same for a like change in pressure in any of the four belloframs. Thus, with the tilt axis so located, and equal pressure conditions existing in the belloframs, an increase in pressure in bellofram 23 would have the same effect upon nozzle-plate orientation (the plate would be moved closer to the nozzle) as would the same increase in pressure in bellofram 21. Similarly, the same increase in pressure in bellofram 24 would have the same effect upon nozzle-plate orientation (in this case the plate would be moved away from the nozzle) as would the same increase in pressure in bellofram 22. In practice, the pressures in more than one bellofram may change simultaneously to give net changes in the bending forces applied by each of the respective bellofram pairs. The overall result would be the same, however, with a net change in the bending force exerted by one bellofram pair effecting the same change in nozzle-plate orientation as an equal net change in the bending force exerted by the other bellofram pair in the same direction.

If the flexure element is adjusted by handle 17 to the position indicated at 50, the tilt axis of the plate will coincide with dashed line C—C. With the tilt axis so located, the effect of a net change in the bending force exerted by bellofram pair 21, 22 upon nozzle-plate orientation will be maximized since the point of application of the said force will lie along a line perpendicular to the said axis. Conversely, with the tilt axis so located, the effect of a net change in the bending force exerted by bellofram pair 23, 24 upon nozzle-plate orientation will be minimized (in effect substantially nullified) since the point of application of the bending force of this latter bellofram pair will lie on a line parallel to the said axis. Thus, changes in pressure conditions in belloframs 21 and 22 will have a significant effect upon pressure conditions within the control nozzle while changes in pressure conditions in belloframs 23 and 24 will have very little, if any, effect on the said nozzle pressure conditions.

With the flexure element adjusted to position 52 and the resultant tilt axis coincident with line B—B, the reverse situation would take place with bellofram pair 23, 24 having maximum effect upon nozzle-plate orientation, and bellofram pair 21, 22, minimum effect thereon.

The flexure element may, of course, be adjusted to any number of positions between the extreme positions 50 and 52 whereby may now be understood the manner in which the effect of net changes in pressure conditions in the bellofram pairs upon nozzle-plate orientation may be precisely controlled by careful adjustment of the flexure element through handle 17.

FIG. 1 schematically depicts the balance plate assembly of the invention utilized in a proportional, force balance controller providing direct controller action. In this application, bellofram 23 is replaced by a compression spring 70 of predetermined force constant, and an air relay 72, preferably but not necessarily of the nature disclosed on page 19 of the seventh edition of Mason-Neilan Catalog No. 208 of November 1962, connected as shown by conduits 74, 76 and 78 to a constant pressure supply source, nozzle 14 and bellofram 24, respectively. A suitable pneumatically operated control device 80, as for example a control valve of conventional construction, is also connected as shown by conduit 82 through conduit 78 to the output pressure of the said air relay, whereby the operation of the said control device may be controlled by the operation of the force balance controller to in turn maintain a variable condition such as fluid flow or pressure at a desired value in a manner made clear by the said Bowditch patent referred to hereinabove.

Adjustment of handle 17 would function to orient the tilt axis of the balance plate in the desired manner whereby the proportioning band setting of the controller would be established. Non-illustrated scale means, cooperatively associated with handle 17, would be provided to indicate the proportioning band setting. Such scale means would, for example, read 0% proportioning band when the flexure element was adjusted to position 50 in FIG. 2, 100% proportioning band with the flexure element in position 51, and infinite proportioning band with the flexure element in position 52.

In operation, briefly described, bellofram 21 would be connected to the set point of pressure of the controller, i.e., a pressure proportional to the value at which the controlled variable is to be maintained, and bellofram 22 connected to the transmitter pressure, i.e., a pressure which varies in proportion to the actual value of the said controlled variable. Thus, the difference in pressures in belloframs 21 and 22, and the resultant force exerted thereby on the balance plate 29, will represent the departure of the variable to be controlled from the desired value thereof. Bellofram 24, the proportional bellofram, is connected as shown through conduit 78 to the output pressure of air relay 72, and a supply of compressed air at constant pressure, for example 20 p.s.i., connected directly to nozzle 14, and to the air relay 72 through conduit 74. With a relay and nozzle input pressure of 20 p.s.i., spring 70 might be chosen to exert a force which requires 9 p.s.i. in the proportional bellofram 24 for equilibrium, i.e., no resultant balance plate movement, when the transmitter and set point pressures are equal. Thus, with the tilt axis adjusted through handle 17 to position A—A in FIG. 2—100% proportional band—the respective moment arms of bellofram pair 21 and 22, and bellofram 24 and compression spring 70, would be equal. In this condition, since the areas of all belloframs are equal, the change in controller output pressure, i.e., that communicated to the control device 80 through conduit 82, would equal the change in transmitter pressure communicated to bellofram 22. Thus, for example, with the set point pressure in bellofram 21 at 3 p.s.i., a 3 to 15 p.s.i. change in transmitter pressure would result in a corresponding 3 to 15 p.s.i. change in the relay output pressure communicated to the said control device, and a 100% proportional band obtained whereby a full range change in the variable transmitter pressure is required to obtain a full range change in the controlling output pressure of air relay 72.

At different settings of the tilt axis, the respective moment arms of the bellofram and bellofram-spring pairs will, of course, be unequal and larger or smaller proportional bands obtained. Thus, with the tilt axis adjusted to position C—C, the narrowest or mechanical throttling band of the nozzle, i.e. 0% proportioning band is obtained.

Conversely, with the tilt axis adjusted to position B—B, infinite proportioning band is obtained whereby the air-relay output pressure will remain, under the input pressure and spring 70 force constant conditions described above, at 9 p.s.i. regardless of the change in transmitter pressure.

FIG. 5 schematically depicts the balance plate assembly of the invention utilized in a proportional-reset, force balance controller providing direct controller action. This application is identical to the application of FIG. 4 with the exception that reset bellofram 23 is utilized rather than a compression spring, and connected as shown through conduit 84 and adjustable, restricted orifice 86, to the output pressure of air relay 72 in conduit 82. In this application, with the variable to be controlled at the set point under equilibrium conditions, i.e., set point and transmitter pressures equal, the respective pressures in the reset and proportional belloframs 23 and 24 will be equal. Departure of the variable to be controlled from the set point will cause the proportioning mechanism to function exactly as above with the exception that a pressure differential will be created, by the effect of orifice 86, between belloframs 23 and 24. Thus, if the variable to be controlled stabilizes at a new value, the pressures in the said belloframs will gradually equalize through the flow of air through the orifice 86, and an output pressure obtained in conduit 82 which corresponds to the original set point. The reset rate, i.e., the number of times per minute that the effect of the proportional action upon the output pressure in conduit 82 is repeated by the reset action, may be varied by the simple adjustment of the variable orifice 86. Reverse action may of course be obtained in the respective force balance controllers of FIGS. 4 and 5 by the simple reversal of the pressures communicated to belloframs 21 and 22.

Figure 7:
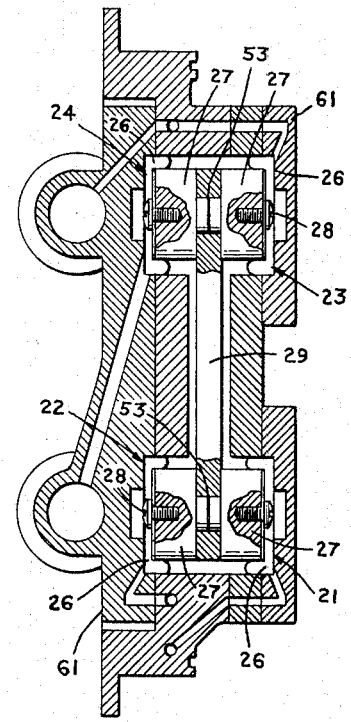
FIG. 7 is a cross sectional view taken along line 7—7 of FIG. 6.
Figure 8:
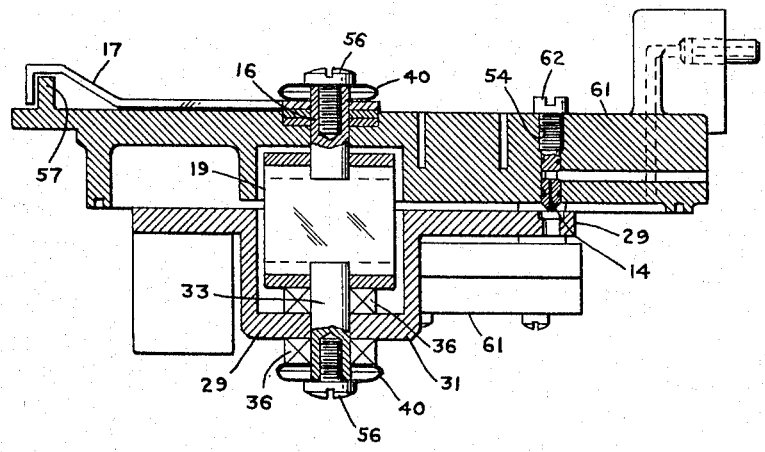
FIG. 8 is a cross sectional view taken along line 8—8 of FIG. 6.

FIGS. 6, 7 and 8 illustrate a balance plate assembly constructed in accordance with the teachings of FIGS. 1–5 with corresponding elements correspondingly numbered throughout. In the construction of FIGS. 6–8, the thrust plate assembly 10 (FIG. 1) is replaced by a casing 61, particularly adaptable in conjunction with the balance plate assembly of the invention and suitable operatively associated pneumatic systems, for use as a force balance controller. In this construction, the control nozzle 14 is screw threaded into casing aperture 54 and provided with an adjusting screw 62 to enable adjustment of the position of the nozzle relative to the plate. The balance plate 29 is attached, as best seen at 53 in FIG. 7, directly to the pistons 27 of the belloframs 21–24, respectively, while the said pistons are in turn attached directly to the expansible, generally cylindrical bellofram chambers 26 by attachment screws 28. The bellofram chambers 26 nest in complementary shaped recesses provided therefor in the casing 61.

The orientation of the cup shaped portions 31 of the balance plate and the flexure element support member 16 may be seen in FIG. 7 to be opposite to the orientation depicted in the exemplary showing of FIGS. 1–3. The resultant function of these elements, and of the balance plate assembly remains exactly the same however, as should be obvious.

A loading spring 40 is maintained at each extremity of the flexure element attachment assembly by screws 56 tightened thereagainst as shown, with the lower screw threadably mounted in the elongated attachment element 33 and the upper screw in the support member 16.

With the combined balance plate and casing assembly of FIGS. 6–8 utilized as a proportional-reset, force balance controller in conjunction with operatively associated pneumatic systems of the nature referred to hereinabove, the belloframs 21–24 would be made responsive, preferably through non-illustrated passages formed directly in the casing, to the same control pressures referred to hereinabove. Thus, bellofram 21 would again be made responsive to the transmitter pressure, bellofram 22 to the set point pressure, bellofram 23 to the reset pressure, and bellofram 24 to the proportional or output pressure. In this construction, a raised casing portion 57 is provided to cooperate with handle 17 whereby the proportioning band scale could be formed thereon and the handle 17 adjusted relative thereto to the desired proportioning band setting.

In addition to the advantages made clear by the construction of FIGS. 1–3, the construction of FIGS. 6–8 is believed to make clear the greater degree of balance plate assembly compactness made possible by the teachings of the invention.

While I have shown and described a preferred form of my invention, it will be understood that the invention may be embodied otherwise than as herein specifically illustrated or described, and that certain changes in the form and arrangement of parts and in the specific manner of practicing the invention may be made without departing from the underlying ideas or principles of this invention within the scope of the appended claims.

What is claimed is:

1. In a control device, a first member, a second member tiltable about an adjustably determinable axis for movement relative to the first member, a bendable element bendable most readily in response to forces applied thereto in one direction, said element rotatably engaging said second member for adjustably determining the said axis in accordance with the orientation of the element relative to the said member, and means cooperatively associated with the second member for applying tilting forces thereto to tiltably move the member about the said axis relative to the first member.

2. In a device as in claim 1 wherein, the element is substantially planar and the said direction is substantially perpendicular to the plane thereof.

3. In a device as in claim 2 wherein, the tilting force applying means comprise pressure responsive means, and the device further includes detecting means cooperatively associated with the first and second member and operable to detect movements of the latter.

4. In a device as in claim 3 wherein, the first member is a fixed, thrust absorbing member, the second member a balance plate, the pressure responsive means a plurality of belloframs, and the detecting means a fluid discharge nozzle relatively positioned so that fluid discharged therefrom impinges on the balance plate.

5. In a device as in claim 4 wherein, the belloframs are arranged in opposed pairs at spaced points on the balance plate with the respective belloframs of each said pair connected directly to opposite sides of the plate.

6. In a device as in claim 1 wherein, the element is a flexure strip.

7. In a device as in claim 5 wherein, the element is a flexure strip.

8. In a mechanically adjustable balance plate assembly, a fixed, thrust absorbing member, a balance plate tiltable about an adjustably determinable axis for movement relative thereto, a flexure strip rotatably engaging said thrust member and balance plate for adjustably determining the said axis in accordance with the orientation of the strip relative to the plate, means for rotating the said strip relative to the said plate, and pressure responsive means cooperatively associated with said balance plate for applying tilting forces thereto to tiltably move the said plate about the said axis relative to the thrust absorbing member.

9. In an assembly as in claim 8 wherein, the pressure responsive means comprise belloframs arranged in opposed pairs at spaced points on the balance plate with the respective belloframs of each pair connected directly to opposite sides of the plate.

10. In an assembly as in claim 9 further including a fluid discharge nozzle connected to the thrust absorbing member and relatively positioned so that fluid discharged therefrom impinges on the balance plate whereby movement of the balance plate relative thereto may be detected thereby.

11. In an assembly as in claim 10 wherein, the balance plate is of generally triangular configuration and rotatably engaged by the flexure strip at a first corner thereof and by a pair of opposed belloframs at each of the second and third corners thereof, respectively.

12. In an assembly as in claim 11 wherein, the fixed, thrust absorbing member comprises casing means, and the balance plate is operatively positioned therewithin.

13. In a force-balance controller for maintaining a variable condition at a predetermined value, a first member, a second member tiltable about an adjustably determinable axis for movement relative to the first member, a bendable element bendable most readily in response to forces applied thereto in one direction, said element rotatably engaging said second member for adjustably determining the said axis in accordance with the orientation of the element relative to the said member, means cooperatively associated with the second member for applying tilting forces thereto to tiltably move the member about the said axis relative to the first member, detecting means cooperatively associated with said first and second members and operable to detect movements of the latter, and control means cooperatively associated with said detecting means and operable to maintain the variable condition at a predetermined value in response to the operation of the said detecting means.

14. In a device as in claim 13 wherein, the element is substantially planar and the said direction is substantially perpendicular to the plane thereof.

15. In a device as in claim 14 wherein, the tilting force applying means comprise pressure responsive means, the first member a fixed, thrust absorbing member, the second member a balance plate, and the detecting means a fluid discharge nozzle relatively positioned so that fluid discharged therefrom impinges on said balance plate.

16. In a device as in claim 15 wherein, the pressure responsive means comprise at least one pair of belloframs arranged in an opposed pair to opposite sides of the balance plate and connected directly thereto, and the control means comprise further pressure responsive means operatively associated with said control nozzle and responsive to pressures created therein by movements of the balance plate relative thereto.

17. In a device as in claim 16 wherein, said further pressure responsive means comprise an operatively associated air relay and pressure responsive control valve.

18. In a device as in claim 13 wherein, the element is a flexure strip.

19. In a device as in claim 16 wherein, the element is a flexure strip.

20. In a device as in claim 19 wherein, the balance plate is of generally triangular configuration and rotatably engaged by the flexure strip at a first corner thereof and by a pair of opposed belloframs at at least a second corner thereof.

21. In a device as in claim 20 wherein, the fixed, thrust absorbing member comprises a casing means, and the balance plate is operatively positioned therewithin.

References Cited by the Examiner

UNITED STATES PATENTS 2,742,917   4/1956   Bowditch _____ 137—86

WILLIAM F. O'DEA, *Primary Examiner.*

A. COHAN, *Examiner.*